United States Patent [19]
Hoshino

[11] Patent Number: 5,651,159
[45] Date of Patent: Jul. 29, 1997

[54] STRUCTURE FOR MOUNTING A WIND RECEIVING MEMBER ON A WIPER DEVICE

[75] Inventor: Takashi Hoshino, Gunma-ken, Japan

[73] Assignee: Mitsuba Electric Manufacturing Co., Ltd., Kiryu, Japan

[21] Appl. No.: 476,559

[22] Filed: Jun. 7, 1995

[30]     Foreign Application Priority Data

Sep. 6, 1994  [JP]  Japan ..................... 6-238404

[51] Int. Cl.⁶ ................ B60S 1/132; B60S 1/40
[52] U.S. Cl. ............... 15/250.201; 15/250.23; 15/250.351; 15/250.32
[58] Field of Search ............ 15/250.201, 250.21, 15/250.23, 250.351, 250.32, 250.31, 257.01, 250.361

[56]             References Cited

U.S. PATENT DOCUMENTS

| | | | |
|---|---|---|---|
| 2,799,887 | 7/1957 | Wernic | 15/250.201 |
| 4,697,297 | 10/1987 | Kobayashi | 15/250.23 |
| 4,989,290 | 2/1991 | Hoshino | 15/250.201 |

FOREIGN PATENT DOCUMENTS

| | | | |
|---|---|---|---|
| 0368090 | 5/1990 | European Pat. Off. . | |
| 0369672 | 5/1990 | European Pat. Off. . | |
| 2487758 | 2/1982 | France | 15/250.32 |
| 2556297 | 6/1985 | France . | |
| 3218847 | 11/1983 | Germany . | |
| 3517575 | 11/1986 | Germany . | |
| 63-32536 | 8/1988 | Japan . | |
| 3-59263 | 6/1991 | Japan . | |
| 2220842 | 1/1990 | United Kingdom | 15/250.201 |

Primary Examiner—Gary K. Graham
Attorney, Agent, or Firm—Oliff & Berridge

[57]            ABSTRACT

A structure for mounting a wind receiving member on a wiper device is provided. An extending section extends from the extreme end side of a wiper arm beyond where a connector member is rotatably supported. Mounting holes are defined in the extending section and in the wiper arm in its base end side opposite the connector member. Mounting pieces of a wind receiving member are fixed by rivets through the mounting holes. The wind receiving member is mounted at the extreme end of the wiper arm by the use of the extending section. With this arrangement, the wind receiving member prevents the floating-up of a wiper blade when a vehicle travels at a high speed.

7 Claims, 5 Drawing Sheets

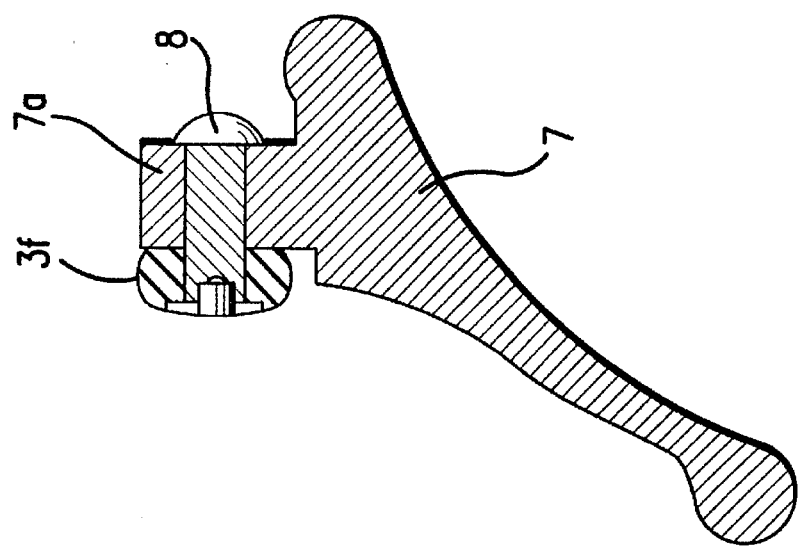
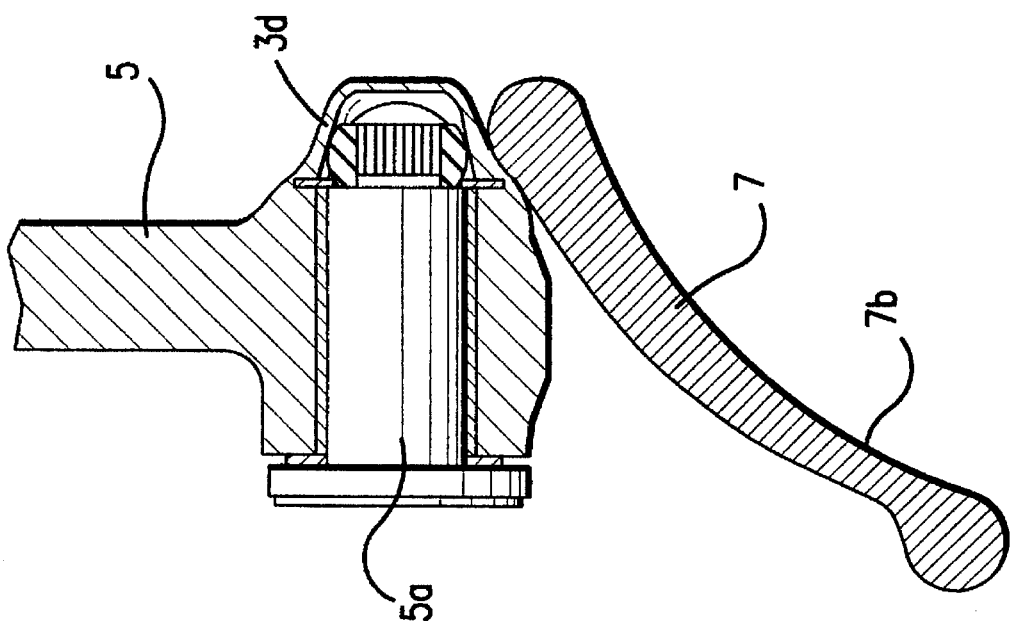

5,651,159

STRUCTURE FOR MOUNTING A WIND RECEIVING MEMBER ON A WIPER DEVICE

BACKGROUND OF THE INVENTION

1. Field of the Invention

The present invention relates to a structure for mounting a wind receiving member on a wiper device mounted to wipe a windshield of vehicles such as buses, trucks, passenger cars and the like.

2. Background of the Related Art

Conventional wiper devices generally have a drawback that when a vehicle travels at high speed, lift is produced in a wiper blade by an air stream blown against a windshield and the wiping capacity of the wiper blade is lowered by a floating-up phenomenon of the blade caused by the lift. To overcome this drawback, a wind receiving member has been conventionally disposed at the extreme end of a wiper arm with which the wiper blade is provided to thereby press the wiper blade against the windshield by a wind pressure received by the wind receiving member.

However, although it is preferable to mount the wind receiving member at a position as near to the extreme end of the wiper arm as possible to suppress the floating-up phenomenon, a conventional wiper arm only extends to a position where the wiper blade is mounted thereto. To cope with this problem, some wiper devices have an arrangement in which the base end side of a wind receiving member is mounted to the extreme end of a wiper arm. The wind receiving member projects in the direction in which the wiper arm extends as shown in Japanese Utility Model Publication No. 63-32536. In this arrangement, the wiper blade has an increased force for pressing against a windshield because the wind receiving member is disposed at the extreme end of the wiper arm. However, since the wind receiving member is cantilevered at the base end side thereof, when a wind pressure is increased as a vehicle travels at high speed, vibration is produced in the wind receiving member. The vibration causes problems in that not only is the life of the wind receiving member shortened, but also quietness in a compartment is disrupted by a chattering noise made by the vibration. Thus, the wind receiving member arranged as described above cannot achieve the desired effect. To achieve the desired effect, an increase of the width and strength of the wind receiving member and the like must be additionally considered.

On the other hand, other wiper devices have an arrangement in which a support arm for a wind receiving member is projected from a wiper arm and the wind receiving member is mounted to the support arm as shown in Japanese Utility Model Publication Laid-Open No. 3-59263. In this arrangement, however, there arises a new problem that since the dedicated support arm is additionally needed, the number of parts is increased and the assembly is therefore more complex.

Further, since a pantograph-type wiper arm needs a sub-wiper arm for rotating a wiper blade in addition to a main wiper arm, an area cast on a windshield is increased. Therefore, when a wind receiving member is mounted to this type of wiper arm, a position where the wiper arm is mounted on the vehicle must be offset upward taking the interference between the wind receiving member and the frame of the windshield into consideration. Thus a problem arises in that when the wiper arm is not operation, a field of view through a windshield is obstructed and further the size of the wiper arm increased.

SUMMARY OF THE INVENTION

Taking the above situation into consideration, an object of the present invention is to provide a structure for mounting a wind receiving member on a wiper device capable of solving the above problems.

According to the present invention, there is provided a structure for mounting a wind receiving member on a wiper device, wherein when the wind receiving member is mounted to a wiper arm having a wiper blade mounted at the extreme end thereof, the wiper arm has an extending portion extending from the extreme end of the upper arm. The extending portion projects from the extreme end side beyond the portion where the wiper blade is mounted to the wiper arm. The wind receiving member is fixed to the extending portion of the wiper arm and the base end side of the wiper arm between the portion where the wiper blade is mounted and a pivot shaft.

Further, there is provided a structure for mounting a wind receiving member on a wiper device, wherein when the wind receiving member is mounted to a wiper arm having a wiper blade mounted at the extreme end thereof. The wiper arm has an extending portion extending from the extreme end thereof so as to project to the extreme end side beyond the portion where the wiper blade is mounted to the wiper arm. The wind receiving member is fixed to the extending section of the wiper arm and the base end side portion of the wiper arm between the portion where the wiper blade is mounted and a pivot shaft. The portion of the wiper arm nearest the wind receiving member is curved and offset to receive the wind receiving member.

With the above arrangements, the wind receiving member is mounted in a position as near to the extreme end side of the wiper arm as possible without the use of a dedicated support arm which would be otherwise separately required.

BRIEF DESCRIPTION OF THE DRAWINGS

FIG. 4 is a cross-sectional view taken along the line 4—4 of FIG. 2;

FIG. 5 is a cross-sectional view taken along the line 5—5 of FIG. 2; and

DESCRIPTION OF PREFERRED EMBODIMENTS

Figure 1:
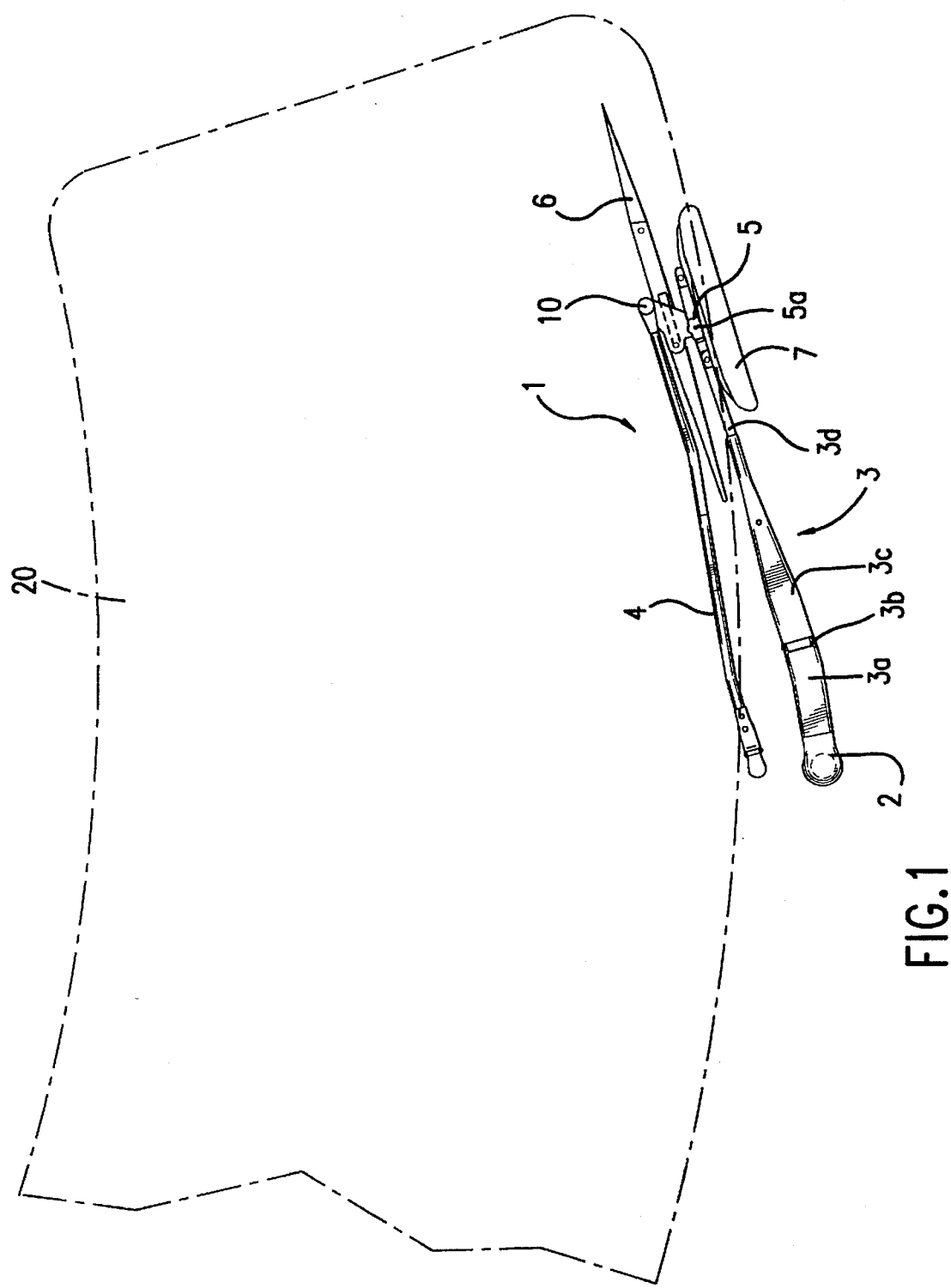
FIG. 1 is a plan view of a first embodiment of the invention.

Next, an embodiment of the present invention will be described with reference to the drawings. In FIG. 1, numeral 1 denotes a pantograph-type wiper arm which is composed of a main arm 3 integrally connected to a pivot shaft 2 which is reciprocatingly driven by the operation of a wiper drive unit (not shown). A sub-arm 4 is disposed in parallel with the main arm 3. The opposite sides of a connector member 5 are rotatably mounted to the respective extreme ends of the main arm 3 and the sub-arm 4 by a swing shaft 5a and a pin 10, respectively. A wiper blade 6 is connected to the connector member 5.

Figure 2:
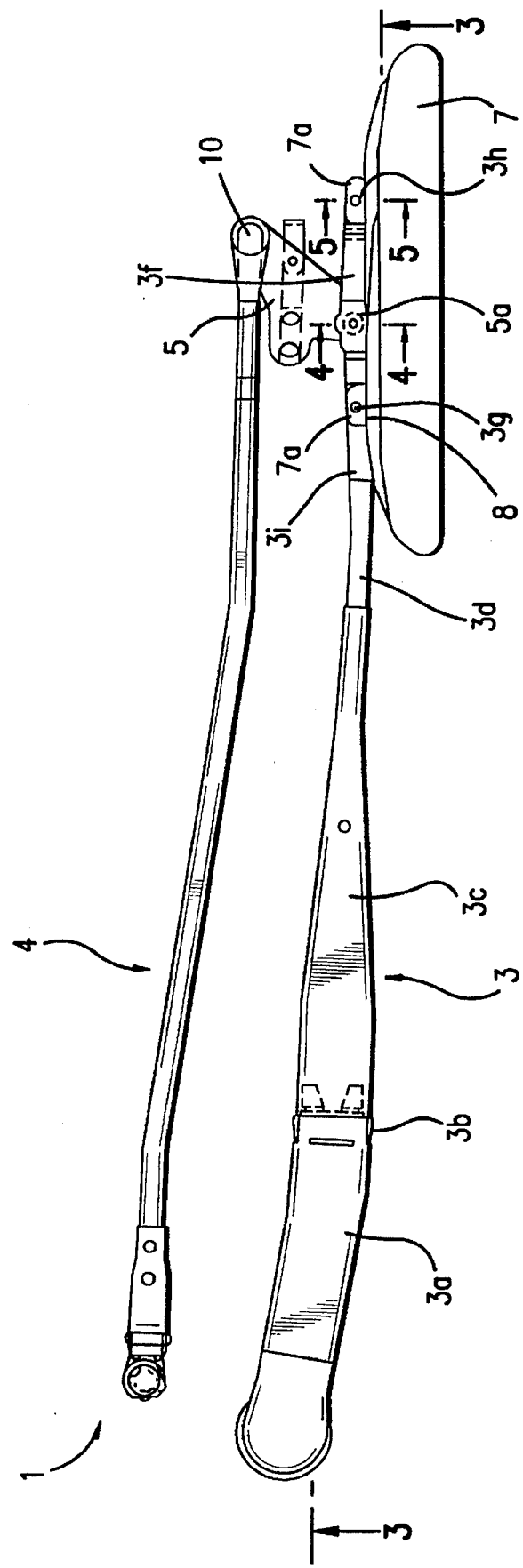
FIG. 2 is a plan view of a wiper arm in the first embodiment of the invention.
Figure 3:
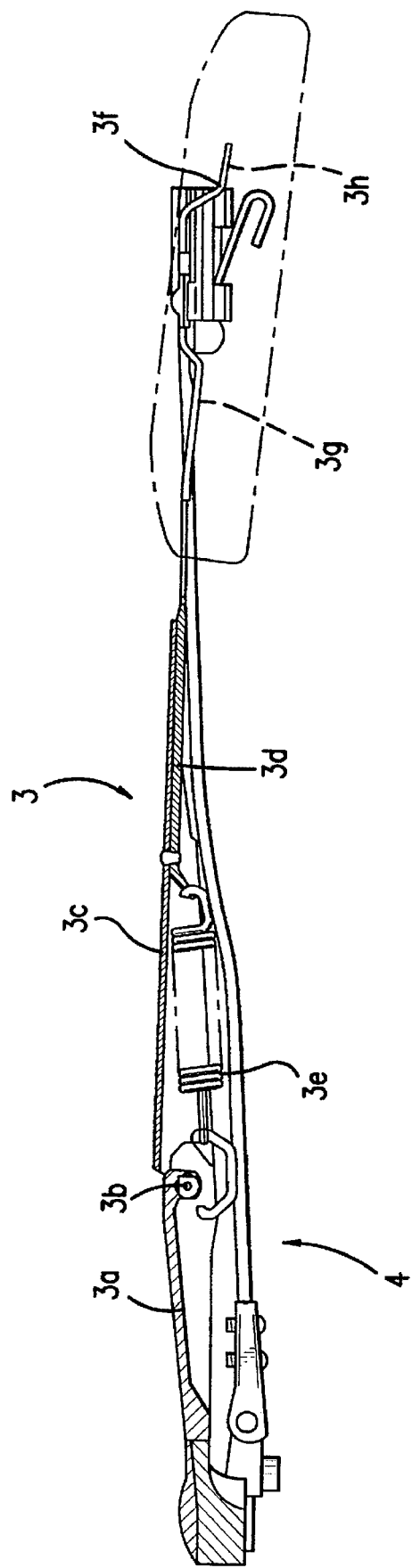
FIG. 3 is a cross-sectional view of the wiper arm taken along the line 3—3 of FIG. 2.

FIG. 2 shows a close-up view of the pantograph-type wiper arm 1. The main arm 3 is composed of respective members such as an arm head 3a connected to the pivot shaft 2, an arm shank 3c swingably connected to the arm head 3a through a support shaft 3b, an arm piece 3d having a base end integrally connected to the arm shank 3c and an extreme end connected to the connector member 5. A spring 3e, shown in FIG. 3, interposed between the arm head 3a and the arm piece 3c urges the extreme end of the arm piece 3d toward a windshield 20, shown in FIG. 1. Formed to the extreme end of the arm piece 3d is an extending section 3f extended to project to the extreme end side beyond the support portion where the above connector member 5 is rotatably supported. Mounting holes 3g, 3h for supporting a wind receiving member 7 to be described below are formed in the arm piece 3d in the base end side and in the extending section 3f at its extreme end side. The mounting holes 3g, 3h are formed on opposite sides of the support portion where the connector member 5 is rotatably supported.

Note, the base end portion of the arm piece 3d and the extreme end portion of the extending section 3f are formed to have substantially the same surface and are curved so that the portions where the mounting holes 3g, 3h are formed are located above the aforesaid surface. A curved portion 3i is formed to the arm piece 3d so that the portion of the arm piece 3d nearest the wind receiving member 7 is slightly curved toward the side opposite to that where the wind receiving member 7 is provided.

The wind receiving member 7 is formed to a ship-bottom shape with an approximately arc-shaped cross section, shown in FIG. 4. A wind pressure is received by the inner surface 7b of the wind receiving member 7. As shown in FIG. 5, the wind receiving member 7 is fixed to the arm piece 3d and the extending section 3f by a pair of mounting pieces 7a projecting outward from the outer surface of the wind receiving member 7 by rivets 8 inserted into both mounting holes 3g, 3h.

In the embodiment of the present invention arranged as described above, when a vehicle travels at a high speed, the wiper blade 6 of the pantograph type wiper arm 1 receives a pressing force from the wind receiving member 7 causing the wiper arm 1 to be pressed against the windshield 20. The force of the wind receiving member overcomes the lift on the wiper blade 6, preventing the reduction of windshield wiping capacity of the wiper blade 6. In this case, since the wind receiving member 7 is mounted to the opposite sides of the arm piece 3d relative to the support portion of the connector member 5, a long distance can be secured from the pivot shaft 2 to the wind receiving member 7. With this arrangement, the pressing force of the wiper arm 1 is increased by the wind receiving member 7 and thus the floating up of the wiper blade 6 is effectively prevented. Also, FIG. 2 shows the pair of mounting pieces 7a symmetrically disposed relative to a longitudinal direction of the wind receiving member 7. Such a symmetrical disposition prevents the wind receiving member 7 from vibrating due to wind pressure when the vehicle travels at high speed.

Since the surface formed by the base end portion of the arm piece 3d and the extreme end portion of the extending section 3f is located below the position where the wind receiving member 7 is mounted, the height of the wiper arm 1 itself is suppressed to a low level while increasing the pressing force of the wind receiving member 7.

In the wiper arm 1 in which the present invention is embodied, since the wind receiving member 7 is supported by the extending section 3f formed to the arm piece 3d constituting the main arm 3, a support arm dedicated for the wind receiving member 7, which would be required in a conventional wiper arm, need not be separately provided. A support arm is not required regardless of the fact that the wind receiving member 7 is mounted as near to the extreme end of the wiper arm 1 as possible so as to sufficiently exhibit a floating-up preventing function. As a result, the number of parts can be reduced because the wind receiving member 7 can be directly mounted to the wiper arm 1 and further the structure of the wiper arm 1 can be simplified.

Further, since the arm piece 3d is offset in the curved portion 3i to the side opposite to that where the wind receiving member 7 is disposed, the wind receiving member 7 can overlap the axial center 3—3 of the main arm 3. Thus, when the wiper arm 1 is at a stop position, the main arm 3 can be located at a lower position without causing the wind receiving member 7 to be abutted against the frame of the windshield 20 so that a large field of view can be secured.

Figure 6:
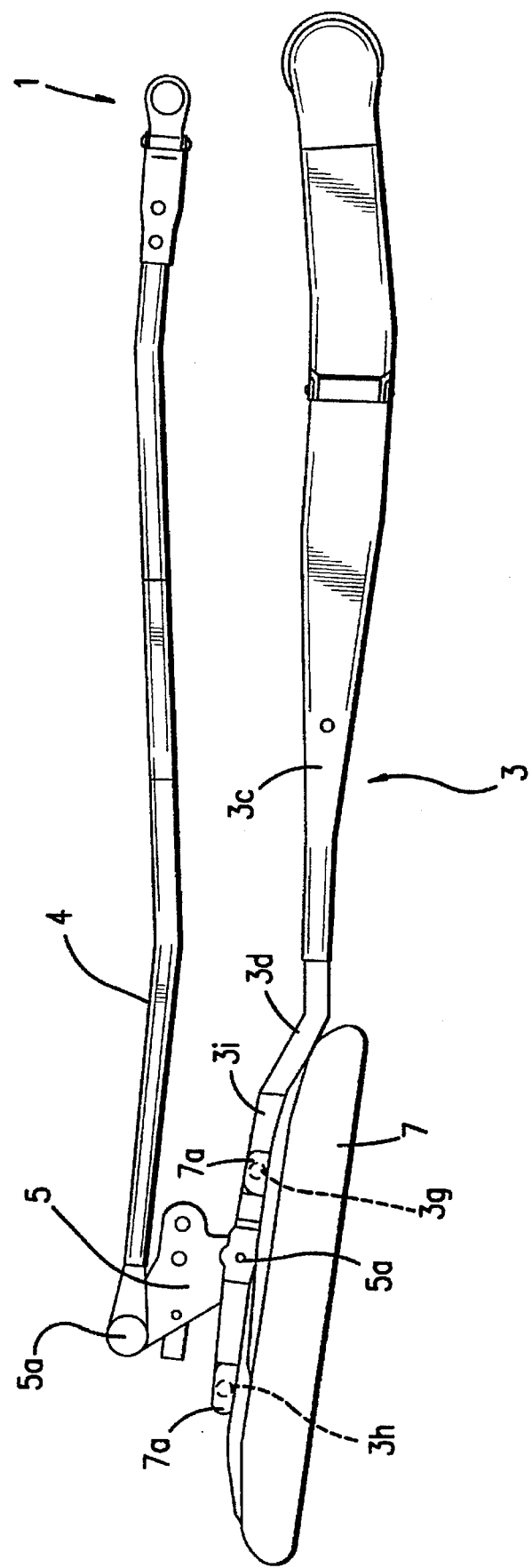
FIG. 6 is a plan view of a wiper arm in a second embodiment of the invention.

The present invention is not limited to the above embodiment, but the main arm 3 to which the wind receiving member 7 is mounted may be arranged such that the curved portion 3i nearest the wind receiving member 7 of the main arm 3 is offset to the sub-arm 4 side in a second embodiment shown in FIG. 6. With this arrangement, the wind receiving member 7 is caused to overlap with the axial center of the main arm 3 as much as possible. In a pantograph-type wiper arm 1, the width of the wiper arm 1 in the swinging direction can be further reduced, whereby the size of the wiper arm 1 can be reduced when it is stowed away.

Further, the wind receiving member 7 need not be mounted to the wiper arm 1 by the rivets 8 as in the above embodiment, but may be fastened by bolts and nuts or screws. When the wind receiving member 7 is mounted in such a manner, it can be dismounted, and thus maintenance can be more easily carried out, such as replacement of the wind receiving member 7 and the like.

When arranged as described above, the wind receiving member 7 for preventing the floating-up of the wiper blade 6 is mounted to the main arm 3 on opposite sides relative to the position where the wiper blade 6 is mounted so the wind receiving member 7 can be located as near to the extreme end of the main arm 3 as possible. As a result, the wind receiving member 7 more effectively prevents floating-up of wiper blade 6.

Moreover, since the wind receiving member 7 is mounted to the extreme end side of the wiper arm 1 by the use of the extending section projecting to the extreme end side beyond the portion where the wiper blade 6 is mounted, it is not necessary to mount the wind receiving member 7 by a dedicated support arm which would be otherwise separately required. Therefore, the number of parts is not increased and the structure of the wiper arm 1 can be more simplified and compact.

What is claimed is:

1. A wiper device comprising:
    an elongated wiper arm having a pivot end portion opposite an elongated wiper blade end portion, the wiper blade end portion having an extending section extending in an opposite direction to said pivot end portion from a wiper blade connection position on the wiper blade end portion;
    a wiper blade mounted intermediate opposite ends thereof, to the wiper blade end portion of the wiper arm only at the wiper blade connection position; and
    a wind receiving member fixed at one location to the extending section and at another location to the wiper blade end portion of the wiper arm between the wiper blade connection position and the pivot end, portion, said wind receiving member for pressing the wiper blade against a windshield by wind pressure received thereon.

2. The wiper device of claim 1, wherein the wiper arm is offset at the wiper blade end portion to receive the wind receiving member.

3. The wiper device of claim 1, wherein the wiper arm defines first and second sides and is offset at the wiper blade end portion toward a side opposite a side where the wind receiving member is fixed.

4. The wiper device of claim 1, further comprising:

a sub-arm; and a connector member having a sub-arm side opposite a wiper arm side, the wiper arm side of the connector member rotatably mounted to the wiper arm at the wiper blade connection position and the sub-arm side of the connector member rotatably mounted to the sub-arm;

wherein the wiper blade is mounted to the connector member.

5. The wiper device of claim 4, wherein the wiper arm is offset at the wiper blade end portion to receive the wind receiving member.

6. The wiper device of claim 4, wherein the wiper arm defines first and second sides and is offset at the wiper blade end portion toward a side opposite a side where the wind receiving member is fixed.

7. A wiper device according to claim 1, further comprising a pair of mounting pieces that fix the wind receiving member to the extending section and to the wiper blade end portion of the wiper arm between the wiper blade connection position and the pivot end portion, the mounting pieces symmetrically disposed relative to a longitudinal direction of the wind receiving member.

* * * * *